May 5, 1959  R. JOHNSON  2,884,658
FISH CLEANING APPARATUS
Filed Nov. 19, 1956
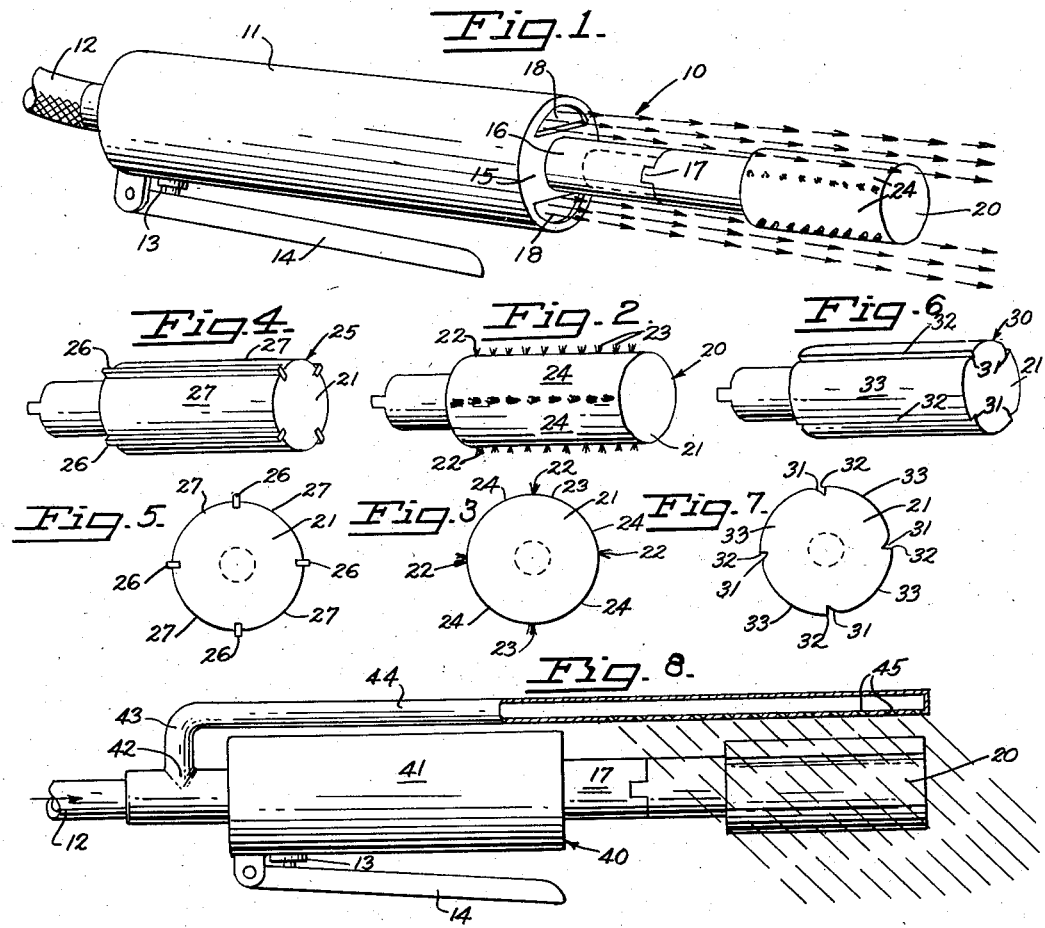
INVENTOR.
RAY JOHNSON
BY
ATTORNEY

United States Patent Office 2,884,658
Patented May 5, 1959

2,884,658

FISH CLEANING APPARATUS

Ray Johnson, San Diego, Calif., assignor to Van Camp Sea Food Company, Inc., San Pedro, Calif., a corporation of California Application November 19, 1956, Serial No. 623,092

1 Claim. (Cl. 17—7)

This invention relates to an apparatus for cleaning pre-cooked eviscerated fish, by removing the outer layer of skin, and by removing, in certain fish such as tuna, less valuable dark-meat portions in a way that saves the removed parts for other uses and leaves intact the maximum amount of the more valuable light-colored meat.

Heretofore the removal described above has been accomplished by cutting off meat with a suitable knife, but this has almost always resulted in the unintentional removal of significant slices of the valuable light-colored meat, due partly to the inability of the cleaner to see how deep the dark-meat extended and because of its lying in an irregular channel in the light-meat. In fact, pre-cooked fish has continued to be cleaned up to the present just as it was cleaned in the 1920's. Women using knives scraped and cut away the skin and bones to get the loins for the finished product, and then cut off sizable portions of the loins while eliminating the bloodmeat from them. The process of cutting and scraping in this manner has been far from ideal; it was wasteful and costly, even when extreme care was used by skilled workmen; when the workmen were not highly skilled and extremely careful, it was still more costly and wasteful. Yet, heretofore, all attempts to clean fish mechanically have proven impractical.

A companion application, Serial No. 623,091 filed November 19, 1956 discloses and claims a method for cleaning fish, while the present application relates particularly to the use of a novel type of cleaning tool, which may be used in that method.

One object of this invention is to provide a fish-cleaning tool that can be used in the method of the companion application and when used results in very efficient operation.

Another object of the invention is to provide a cleaning tool that can satisfactorily eliminate the skin and bloodmeat from cooked tuna loins without wasting the valuable light-colored meat.

Another object of the invention is to provide a tool whose use improves the quality of the finished meat, gives higher case-yields per ton of the fish processed, and produces less employee fatigue.

Another object of the invention is to increase the speed of cleaning pre-cooked fish by providing an improved fish-cleaning tool.

Another object of the invention is to provide a tool with a rotating surface that scrapes and abrades off the unwanted portions instead of cutting them off, as does a knife.

Another object of the invention is to provide a tool that shreds away the bloodmeat from the light meat, and shreds it in such a manner that it can most easily be prepared for use as a by-product.

My invention solves these problems and accomplishes the above objects by employing a small power-driven tool held in the hand of the operator and provided with a rotating hob or drum. This hob or drum replaces the cleaning knife; its rotation removes all the waste—skin, small bones, bloodmeat, and blemishes—by shredding it away from the light meat of the loins, holding the waste to a bare minimum. My apparatus also provides for a flow of air past the hob in a direction away from the operator and from the driving end of the tool, and this flow of air continually cleans the hob, blowing away the shredded particles from the loins and giving the operator better visibility so she can see what she is doing. The flow of air may also direct the waste away from the fish loins being worked on and move it to a disposal station.

Other objects and advantages of the invention will appear from the following description of some preferred embodiments.

In the drawings:

Fig. 1 is a view in perspective of a fish-cleaning tool embodying the principles of this invention, the tool including an air-driven motor with a removable hob mounted on one end. The flow of air over the hob is indicated by a stream of arrows.

Fig. 2 is a view in perspective of one form of removable hob which may be used.

Fig. 3 is a view in end elevation of Fig. 2.

Fig. 4 is a view like Fig. 2 of a modified form of removable hob.

Fig. 5 is a view in end elevation of Fig. 4.

Fig. 6 is a view like Fig. 2 of another modified form of removable hob.

Fig. 7 is a view in end elevation of the hob of Fig. 6.

Fig. 8 is a view in side elevation and partly in section of a modified form of fish-cleaning tool embodying the principles of the invention, in which the air that blows over the hob and clears away the waste material is sent out from a tube that extends parallel to the hob, its air being obtained adjacent the input end of the air motor instead of from the output end, as in Fig. 1.

Fig. 9 is a view similar to Fig. 8 of another modified form of the invention in which a flexible drive shaft is used to drive the hob, and a separate air conduit is used to provide the current of air that blows away the waste.

Fig. 1 shows a fish-cleaning tool 10 incorporating a small air-powered motor 11 of familiar type connected to the end of an air conduit 12 and provided with an actuation valve 13 controlled by a hand-operated lever 14. The drive end 15 of the motor 11 rotates a shaft 16 provided with a chuck or collet 17 to which is attached a removable hob 20. A pair of air outlet slots 18, 18 exhaust the air that has driven the motor rotor and project it along paths parallel to the axis of the rotating hob 20 and across its surface so as to clean it continually from the shredded waste.

Preferably, the speed of the motor is variable, conveniently ranging from 1,000 to 4,000 r.p.m., and controlled by the lever 14 in the hand of the cleaner. The chuck or collet 17 at the end of the drive shaft 16 is preferably adapted to hold various types of cylinders or hobs that may be used in the operation, depending on the kind of fish, etc.

The hob 20 preferably has a cylindrical body 21, whose diameter may vary between about ½″ to 1½″ and whose length may vary from about 1″ to 3″. As shown in Figs. 2 through 6, the cylinders 21 may be made with various types of cutting edges, preferably arranged in axially-extending rows.

The hob 20 shown in Figs. 1–3 has a Plexiglas or nylon cylinder 21 (for the sake of light weight with strength) holding four rows 22 of bristles 23, preferably of nylon. The bristles 23 may be evenly spaced around the cylinder 21, each bristle protruding approximately ¹⁄₃₂″. In each row 22 the bristle tufts may be placed on ⅛″ centers. Preferably the bristle tufts are staggered from row to row to give a self-cleaning action. Axially extending channels 24 are provided in between the rows 22 of brush bristles to aid in keeping the tool continually clean. The currents of air coming from the exhaust ports 18, 18 are directed along these channels 24 and blow off any particles that tend to stick on. More or fewer rows 22 of bristles may be used, and there may be more or fewer tufts or bristles 23 in each row 22, though four rows 22 have given excellent results.

A modified form of hob 25 shown in Figs. 3 and 4 also has a similar light-weight cylinder 21 which may again be made from Plexiglas or nylon, and which holds four blades 26, preferably made from Teflon (tetrafluoroethylene polymer). The blades 26 preferably extend axially, are spaced evenly around the cylinder, and protrude approximately $\frac{1}{32}''$. Again, axial channels 27 are provided between the blades 26 to prevent accumulation of waste and to enhance the cleaning by air. Here, again, though four blades 26 are shown, there may be more (e.g., six) or fewer (e.g., three) blades 26, but four has been found to be a very satisfactory number for the particular size of cylinder and speed of operation that is preferred.

In place of using a plastic type of cylinder 21, the cylinder 21 may be made from aluminum or other light metal, as in the hob 30 as shown in Figs. 6 and 7. This hob 30 is provided with a plurality (preferably four or six) of evenly spaced recessed slots 31 about $\frac{1}{8}''$ wide and $\frac{1}{8}''$ deep, providing what are, in effect, blades 32 and channels 33. The blades 32, like the blades 26 and bristle rows 22, may be termed cutting members or portions or shredding means, and the device may be termed a shredding device.

As shown in Fig. 1, the air stream directed axially along the cylinder 21 from the exhaust ports 18, 18 keeps the cylinder 21 and the working surface of the fish clear of waste. It also prevents waste from flying in the air and may be used to move the waste to a desired location, such as a hole through the cleaning table, through which is falls to a bin or conveyor, whence it is conducted away. Note that the exhaust air leaving the motor through the holes or slots 18, as shown in Fig. 1, is directed around and across the cutting edges of the cylinder 21.

In Fig. 8, a modified form of tool 40 is shown, the same as the tool 20 except that no reliance is made on exhaust port air. Instead, the air motor 41 is provided with a T connection 42, one arm 43 of which is directly connected to a tubular member 44. The member 44 extends parallel to the axis of the hob 20 and is provided with a series of angularly directed perforations 45. These angularly directed perforations cause the air to extend out at about 45° across the cleaning tool hob 20, or at any other desired angle. The tool hob 20 is rotating constantly, so that the air is always in contact at each revolution and directs the material away from the motor and toward a desired location.

In Fig. 9 a further modification 50 is shown. Here the hob 20 is not driven by an air motor, but rather by a flexible shaft 51, to which it is attached by a suitable chuck or collet 52 of known type. The desired flow of air across the hob 20 is provided by a separate air conduit 53 leading from an air compressor (not shown) to an emission device 54 (which is generally like the tube 44), preferably provided with angularly extending outlet holes 55 that direct the air across the fish cleaning hob at an angle extending outwardly and downwardly. The effect is essentially the same as that of the structure of Fig. 8.

For most uses, the structure shown in Fig. 1 is believed to be the simplest and the most desirable; however, the different type of fish and processes concerned make a difference in the preference.

It does not make any particular difference whether the drums 21 rotate clockwise or counter-clockwise. In either event, when applied to the precooked fish, they give a gentle cutting action like that of sanding. They easily remove the outside skin around the loins, as well as small bones that may be left, and they are particularly useful in removing the bloodmeat which lies in a generally V-like strip running lengthwise of the fish.

The use of the fish cleaning tool to give a rotating surface that scrapes or abrades off the portions to be removed may be compared with the operation of removing a stained surface from a piece of wood. Here again a knife can be used, but the use of a rotating sander enables much more delicate action to be done by an unskilled worker, and involves less indentation of the wood. Only the part to be removed is affected. By the use of this particular tool, a similar result can be obtained in cleaning fish.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

A fish cleaning tool comprising an elongated air motor having a rotary drive shaft extending from an end therefrom, a fish cleaning substantially cylindrical tool attached to said shaft, said tool having axially arranged cutting elements thereon, said motor having air exhaust ports in the end thereof from which said shaft extends, said ports being in substantial alignment with said cutting elements, whereby upon operation, the air issuing from said exhaust ports will be directed along said elements to keep the same clean.

References Cited in the file of this patent

UNITED STATES PATENTS

| | | |
|---|---|---|
| 663,561 | Constantine | Dec. 11, 1900 |
| 1,107,100 | Palmer | Aug. 11, 1914 |
| 1,549,855 | Cote | Aug. 18, 1925 |
| 2,481,182 | Waters | Sept. 6, 1949 |
| 2,482,775 | Hollick | Sept. 27, 1949 |
| 2,655,689 | Witte | Oct. 20, 1953 |